United States Patent [19]
Kaiser et al.

[11] Patent Number: 4,823,004
[45] Date of Patent: Apr. 18, 1989

[54] TUNNEL AND FIELD EFFECT CARRIER BALLISTICS

[75] Inventors: William J. Kaiser, West Covina; L. Douglas Bell, Pasadena, both of Calif.

[73] Assignee: California Institute of Technology, Pasadena, Calif.

[21] Appl. No.: 125,009

[22] Filed: Nov. 24, 1987

[51] Int. Cl.$^4$ ............................................. H01J 37/26
[52] U.S. Cl. .................................. 250/306; 250/307; 250/311
[58] Field of Search ........................ 250/306, 307, 311

[56] References Cited

U.S. PATENT DOCUMENTS 4,618,767 10/1986 Smith et al. ........................ 250/306

OTHER PUBLICATIONS

Drake et al., Rev. Sci. Instrum., 57(3), Mar. 1986, pp. 441–445.
Russell Young, John Ward, and Fredric Scire, *The Topografiner: An Instrument for Measuring Surface Microtopography*, Rev. Sci. Instrum., 1972, 43, 999.
G. Binnig, H. Rohrer, Ch. Gerber, and E. Weibel, *Tunneling Through A Controllable Vacuum Gap*, Appl. Phys. Lett., 1982, 40, 178.
Drs. G. Binnig, C. F. Quate and Ch. Gerber, *Atomic Force Microscope*, Phys. Rev. Lett., 1986, 56, 930.
G. Binnig, H. Rohrer, Ch. Gerber and E. Weibel, *Surface Studies by Scanning Tunneling Microscopy*, Phys. Rev. Lett., 1982, 49, 57, of IBM Zurich Research Laboratory.
U. Dürig, J. K. Gimzewski and D. W. Phol, *Experimental Observation of Forces Acting During Scanning Tunneling Microscopy*, Phy. Rev. Lett., 1986, 57, 2403.
Gary M. McClelland, Ragnar Erlandsson and Shirley Chiang, *Atomic Force Microscopy: General Principles and a New Implementation*, accepted for publication in Review of Progress in Quantitative Non-Destructive Evaluation, vol. 6, Plenum, NY (1987).
Ch. Gerber, B. Binnig, H. Fuchs, O. Marti and H. Rohrer, *Scanning Tunneling Microscope Combined with a Scanning Electron Microscope*, Rec. Sci. Instrum., 1986, 57, 221.
G. Binnig and H. Rohrer, *Scanning Tunneling Microscopy*, Helvetica Physica Acta, vol. 55 (1982), 726–735.
Calvin F. Quate, *Vacuum Tunneling: A New Technique for Microscopy*, Phys. Today (Aug. 1986), 26–33.
N. Braslau, *Contact and Metallization Problems in GaAs Integrated Circuits*, J. Vac. Sci. Technol. A, 4(6), Nov./Dec. 1986, 3085–90.
W. J. Kaiser and R. C. Jaklevic, *Scanning Tunneling Microscope Study of Metals: Spectroscopy and Topography*, Surf. Sci. 181, 55 (1987).
S. M. Sze et al, *Hot-Electron Transport in Semiconductor-Metal-Semiconductor Structures*, J. App. Phys, 2690, 37 (1966).

*Primary Examiner*—Bruce C. Anderson
*Assistant Examiner*—Jack I. Berman
*Attorney, Agent, or Firm*—Benoit Law Corporation

[57] ABSTRACT

Methods and apparatus for interacting carriers with a structure of matter employ an electrode for emitting said carriers at a distance from a surface of that structure, and cause such carriers to travel along ballistic trajectories inside that structure by providing along the mentioned distance a gap for performance of a process selected from the group of carrier tunneling and field emission and injecting carriers emitted by the mentioned electrode and that process ballistically into the structure through the gap and the mentioned surface. The carriers are collected or analyzed after their travel along ballistic trajectories in the structure of matter. Pertinent information on the inside of the structure is obtained by conducting inside that structure what conventionally would have been considered external ballistics, while performing the carrier-propelling internal ballistics conversely outside that structure.

48 Claims, 4 Drawing Sheets

TUNNEL AND FIELD EFFECT CARRIER BALLISTICS

The invention described herein was made in the performance of work under a NASA contract, and is subject to the provisions of Public Law 96-517 (35 USC 202) in which the Contractor has elected to retain title.

BACKGROUND OF THE INVENTION

The present invention relates to electron or carrier ballistics utilizing electron or carrier tunneling or field emission as electron or carrier propellant, to subsurface and other investigation of matter by such electron or carrier ballistics, and to utilization of such electron or carrier ballistics in electronics and other areas.

Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

The need for direct, reproducible methods of measuring metal-semiconductor interface properties has been felt for many years. Much of the interest has been centered in application to device research and development. For an appreciation of the magnitude of the problem, reference may be had to N. Braslau, *Contact and metallization problems in GaAs integrated circuits,* J. Vac. Sci. Technol. A 4(6), Nov/Dec 1986, 3085-90.

As Dr. Braslau points out, GaAs chips of impressive complexity, density, and performance have been built and tested, but essentially as single, unconnected entities. Results have been marginally adequate, and further increase in density, such as for very large scale integration (vLSI), will require better control over barrier heights and higher performance will require lower contact resistance to self-aligned transistor structures. The fundamental limitation is that there has not yet been a good understanding of the nature of the surface of a compound semiconductor, the modification introduced by the deposition of a film, and the consequential electrical transport across that interface.

In an entirely separate development, what has become known as the Scanning Tunneling Microscope (STM) has enabled electron tunneling between two conductors separated only by vacuum, gas, or liquid. The STM technology breakthrough allows the separation of tunnel electrodes to be held constant under electromechanical control at 5-10 Å with a tolerance of $10^{-2}$-$10^{-4}$ Å.

Of course, the subject invention should be distinguished from Scanning Tunneling Microscopy (STM), even though embodiments thereof may in part use similar instrumentation, which is why a summary thereof is given herein.

STM sprang from efforts to characterize the topography of surfaces at the atomic level, manifesting themselves initially in the so-called "topografiner" developed by Russell Young, John Ward and Fredric Scire, as apparent from their article entitled *The Topografiner: An Instrument for Measuring Surface Microphotography,* Rev. Sci. Instrum., 1972, 43, 999. The topografiner produced real space images of irregular surfaces. Since the topografiner achieved lateral resolutions on the order of 4000 Å and surface normal resolutions of 30-40 Å, it was a notable development of the past six years when Binnig et al. overcame various stability problems and demonstrated the first scanning tunneling microscope which achieved lateral resolutions on the order of tens of angstroms, with angstrom resolution normal to the surface.

Early STM designs went to great lengths to achieve tunneling gap stability. As apparent from their article entitled *Tunneling Through A Controllable Vacuum Gap,* G. Binnig, H. Rohrer, Ch. Gerber, and E. Weibel, Appl. Phys. Lett., 1982, 40, 178, demonstrated tunneling from a W tip to a Pt surface with an STM in a vacuum chamber on a stone bench "floating" on inflated rubber tubes.

Internal vibrations were filtered out by magnetic levitation over a superconducting bowl of Pb which was superinsulated and cooled directly by liquid He. Subsequently, tunneling current has been demonstrated with less elaborate STM units. The key is structural rigidity of the tip-sample connection which forces any external vibrations to move tip and sample identically and simultaneously. There now are STM's with lateral resolutions of less than 5 Å and normal resolutions of hundredths of angstroms.

In an article entitled *Atomic Force Microscope,* Phys. Rev. Lett., 1986, 56, 930, Drs. G. Binnig, C. F. Quate and Ch. Gerber proposed measurement of ultrasmall forces on particles as small as single atoms by monitoring the elastic deformation of various types of springs with their scanning tunneling microscope. By way of background, they pointed out that it has been a common practice to use the displacement of springs as a measure of force, and that previous methods have relied on electrostatic fields, magnetostatic fields, optical waves, and x-rays. They also commented that SQUIDs are superconducting elements that measure the expulsion of magnetic fields in variable-inductance devices, and that have been used in gravity gradiometers to measure displacements of $10^{-6}$ Å. Others in their work with van der Waals forces have used optical interference methods to measure displacements of 1 Å. Their effort similarly was concerned with penetrating the regime of interatomic forces between single atoms and they proposed their atomic force microscope (AFM) as a new tool designed to exploit that level of sensitivity, enabling investigation of both conductors and insulators on an atomic scale. They envisioned a general-purpose device that will measure any type of force; not only the interatomic forces, but electromagnetic forces as well. However, the atomic force microscope actually disclosed in that article is a combination of the principles of the scanning tunneling microscope and the stylus profilometer.

In their proposed first mode, they modulated the sample in the z-direction at its resonant frequency (5.8 kHz). The force between the sample and the diamond stylus—the small force that they want to measure—deflects the lever holding the stylus. In turn, this modulates the tunneling current which is used to control the AFM-feedback circuit and maintain the force $f_o$ at a constant level.

In their second and third modes, the lever carrying the diamond stylus is driven at its resonant frequency in the z-direction with an amplitude of 0.1 to 10 Å. The force, $f_o$, between sample and stylus changes the resonant frequency of the lever. This changes both the amplitude and phase of the ac modulation of the tunneling current. Either of these can be used as a signal to drive the feedback circuits.

In the fourth mode they used one feedback circuit. It was connected to the AFM and it was controlled by the tunneling current in the STM. This system maintained the tunneling gap at a constant level by changing the force on the stylus.

The fourth mode was further improved by reconnection of both feedback circuits in such a way that the AFM sample and the STM tip were driven in opposite directions with a factor less in amplitude for the STM tip. The value of $\alpha$ ranged from 10 to 1000.

In contrast to previous methods, the absolute value of $f_o$, the force on the stylus, was not well defined except at the beginning of the measurement, even in the absence of thermal drifts. However, they saw the limiting sensitivity of their instrument as far less than interatomic forces ranging from ionic bonds to van der Waals bonds and down to perhaps $10^{-12}$ N for some of the weaker forces of surface reconstruction. Their AFM, therefore, should be able to measure all of the important forces that exist between the sample and adatoms on the stylus.

They further pointed out that these forces also exist in the tunneling microscope itself and that they can have a strong influence on the data collected with the STM. Accordingly, they mentioned that the STM could be used as a force microscope in the mod they described by simply mounting the STM tip on a cantilever beam.

Further background materials include another article by G. Binnig, H. Rohrer, Ch. Gerber and E. Weibel, of the IBM Zurich Research Laboratory, entitled *Surface Studies By Scanning Tunneling Microscopy*, Phys. Rev. Lett., 1982, 49, 57, an article by U. Dürig, J. K. Gimzewski and D. W. Phol, entitled *Experimental Observation of Forces Acting During Scanning Tunneling Microscopy*, Phys. Rev. Lett., 1986, 57, 2403, and another article on atomic force microscopy by Gary M. McClelland, Ragnar Erlandsson and Shirley Chiang, entitled *Atomic Force Microscopy: General Principles and a New Implementation*, accepted for publication in Review of Progress in Quantitative Non-Destructive Evaluation, Vol. 6, Plenum, N.Y. (1987).

An interesting design is apparent from an article by Ch. Gerber, G. Binnig, H. Fuchs, O. Marti and H. Rohrer, entitled *Scanning Tunneling Microscope Combined With a Scanning Electron Microscope*, Rev. Sci. Instrum., 1986, 57, 221, disclosing their "Pocket-Size" STM needing very little external vibration isolation.

*Scanning tunneling microscopy* also has been described in an article thus entitled by G. Binnig and H. Rohrer, published in Helvetica Physica Acta, Vol. 55 (1982) 726–735.

In 1986, Drs. Binnig and Rohrer received the Nobel Prize in Physics for their above mentioned work.

An overview has been published by Calvin F. Quate under the title of *Vacuum tunneling: A new technique for microscopy*, PHYS. TODAY (Aug. 1986) 26–33, mentioning inter alia topography, surface state studies, surface charge density measurements, catalytic reaction studies, and material deposition as present or prospective fields of application.

One of the inventors hereof also developed a scanning tunneling microscope, as may be seen from W. J. Kaiser and R. C. Jaklevic, *Scanning Tunneling Microscope Study of Metals: Spectroscopy and Topography*, Surf. Sci. 181, 55 (1987). That Scanning Tunneling Microscope system was operated in several environments for both topographic imaging and tunnel spectroscopy. It shows high resistance to the effects of vibration and thermal drift. The device is unique in its simplicity and has only four moving parts. In addition, the critical tip-sample approach mechanism is inherently reliable and precise. That STM system accommodates a wide range of sample geometries and requires no special sample holder.

However, independently of such technological advances, the decade-old practice of using electron tunneling devices as signal detectors for electromagnetic radiation, as microwave signal sources, and as digital switching elements has continued. Historically, electron tunneling appeared only in devices where a thin tunnel "barrier" insulator was trapped between two conducting electrodes. Some innovation arose when S. M. Sze, C. R. Crowell, G. P. Carey, and E. E. LaBate, in an article entitled *Hot-Electron Transport in Semiconductor-Metal-Semiconductor Structures*, J. App. Phys. 2690, 37 (1966), disclosed semiconductor-metal-semiconductor point-contact-transistor structures for hot electron transport. It appears, however, that that kind of hot-electron transport structure has inherent limitations, which may explain why such devices have not become commercially significant in the two decades since their disclosure.

SUMMARY OF THE INVENTION

It is a general object of this invention to overcome the disadvantages and problems and to meet the needs expressed or implicit in the above Information Disclosure Statement or in other parts hereof.

It is a germane object of this invention to provide improved useful methods and apparatus for interacting carriers with structures of matter.

It is a related object of this invention to enable and conduct subsurface investigations of various semiconductor and other structures.

It is also an object of this invention to provide and carry out tunnel and/or field effect carrier ballistics for and in semiconductor devices and other structures.

It is a further object of this invention to provide and display topographic information about various structures.

It is a germane object of this invention to provide and display information about various parameters and qualities inside semiconductive and other structures.

Other objects of the invention will become apparent in the further course of this disclosure.

From one aspect thereof, the subject invention resides in a method of interacting carriers with a structure of matter, and, more specifically, resides in the improvement comprising, in combination, the steps of providing said structure as a layered structure including an interface therein, providing an emitter electrode for emitting said carriers at a distance from a surface of said layered structure, causing said carriers to travel along ballistic trajectories inside said layered structure by providing along said distance a gap for performance of a process selected from the group of carrier tunneling and field emission and injecting said carriers emitted by said emitter layered with electrode with said process ballistically into said structure through said gap and said surface, and analyzing said carriers after said travel along said ballistic trajectories interface properties in said layered structure including said interface.

From a related aspect thereof, the invention resides in apparatus for interacting carriers with a layered structure including an interface therein, and more specifically, resides in the improvement comprising, in combination, an emitter electrode for emitting said carriers at a distance from a surface of said layered structure, means for causing said carriers to travel along ballistic trajectories inside said layered structure, including means for providing along said distance a gap for performance of a process selected from the group of carrier tunneling and field emission, and means for injecting said carriers emitted by said emitter electrode with said process ballistically into said structure through said gap and said surface, and means for analyzing interface properties in said layered structure, including means for collecting said, carriers after travel along said ballistic trajectories from said interface in said structure.

According to a preferred embodiment of the invention, carriers traveling along the above mentioned ballistic trajectories are employed for investigations inside the structure of matter. The structure may be advantageously scanned with the above mentioned electrode or ballistic electron injection process, for investigations throughout certain parts or all of the structure.

Other aspects of the invention will become apparent in the further course of this disclosure, and no restriction to any aspect, object or feature is intended by this Summary.

BRIEF DESCRIPTION OF THE DRAWINGS

The subject invention and various aspects and objects thereof will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
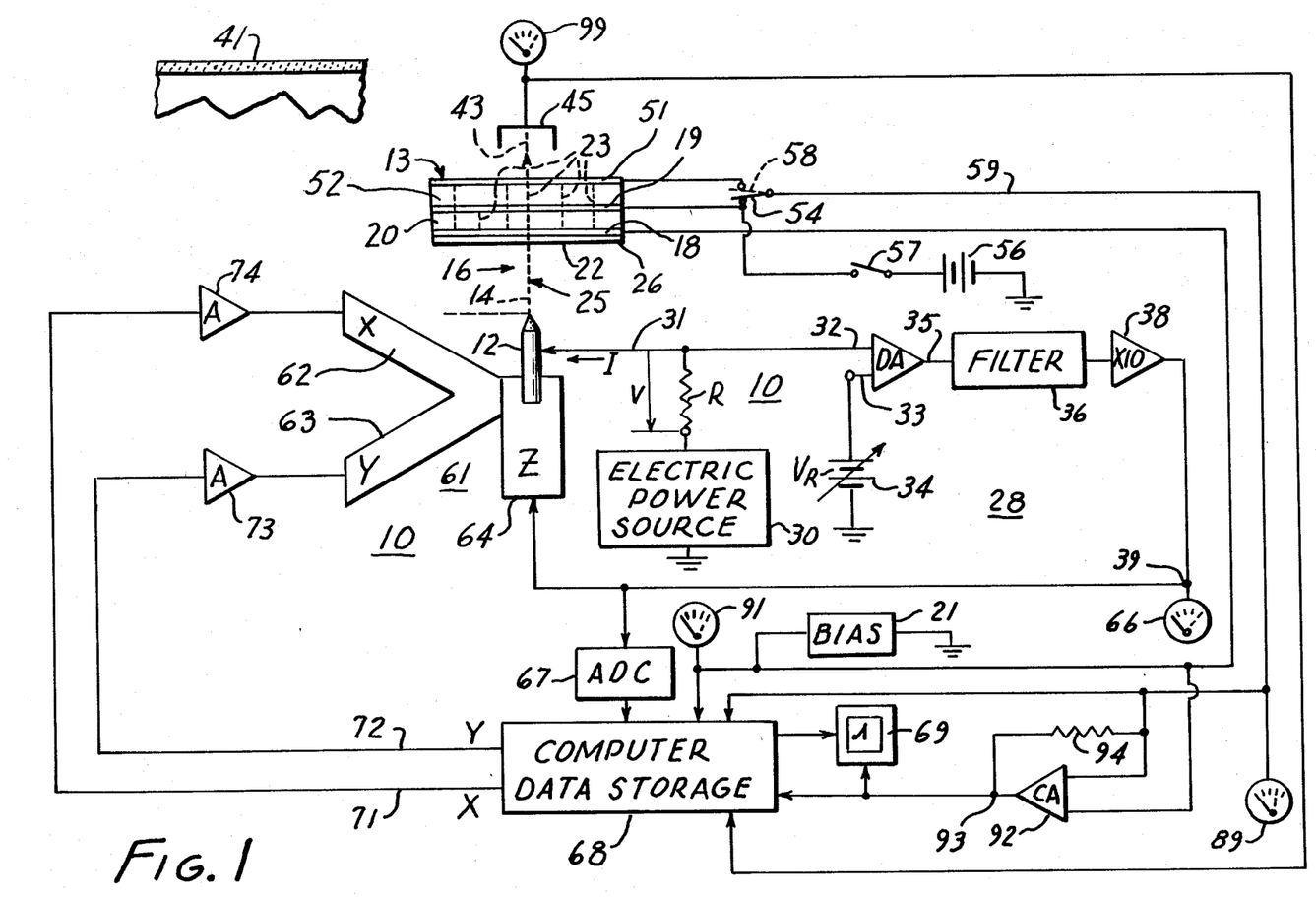
FIG. 1 is a block diagram and other diagrammatic showing of a system for interacting carriers with a semiconductive or other structure of matter according to a preferred embodiment of the subject invention.

From one aspect thereof, the subject invention and its embodiment shown in FIG. 1 enable provision of topographic and electronic information on *subsurface* interface properties, by what we have termed ballistic electron emission microscopy (BEEM).

In this configuration, and with the illustrated apparatus 10, electrons are injected by a tip 12 into a sample 13, which, by way of example, consists of a layered structure, comprising layers separated by the interfaces of interest. These interfaces may be Schottky barriers. Electrical contact is established with each of the layers, providing for separate biasing and current collection at each layer.

In the specifically illustrated implementation, BEEM is operated as a three-electrode system, which may be treated as an emitter-base-collector (transistor) device. The tip 12 serves as emitter by injecting electrons 14 across the vacuum tunneling gap 16 into the base. The base comprises or is constituted by a biasing or base electrode 18, being the second electrode after the first or emitter electrode 12. A third electrode acts as the collector 19, which detects the electrons which successfully traverse the base and the base-collector interface at 20. Emitter-base current and voltage are controlled independently. The base electrode 18 is sufficiently thin so that many of the injected electrons do not thermalize, but propagate ballistically across the base and enter the collector 19.

Figure 2:
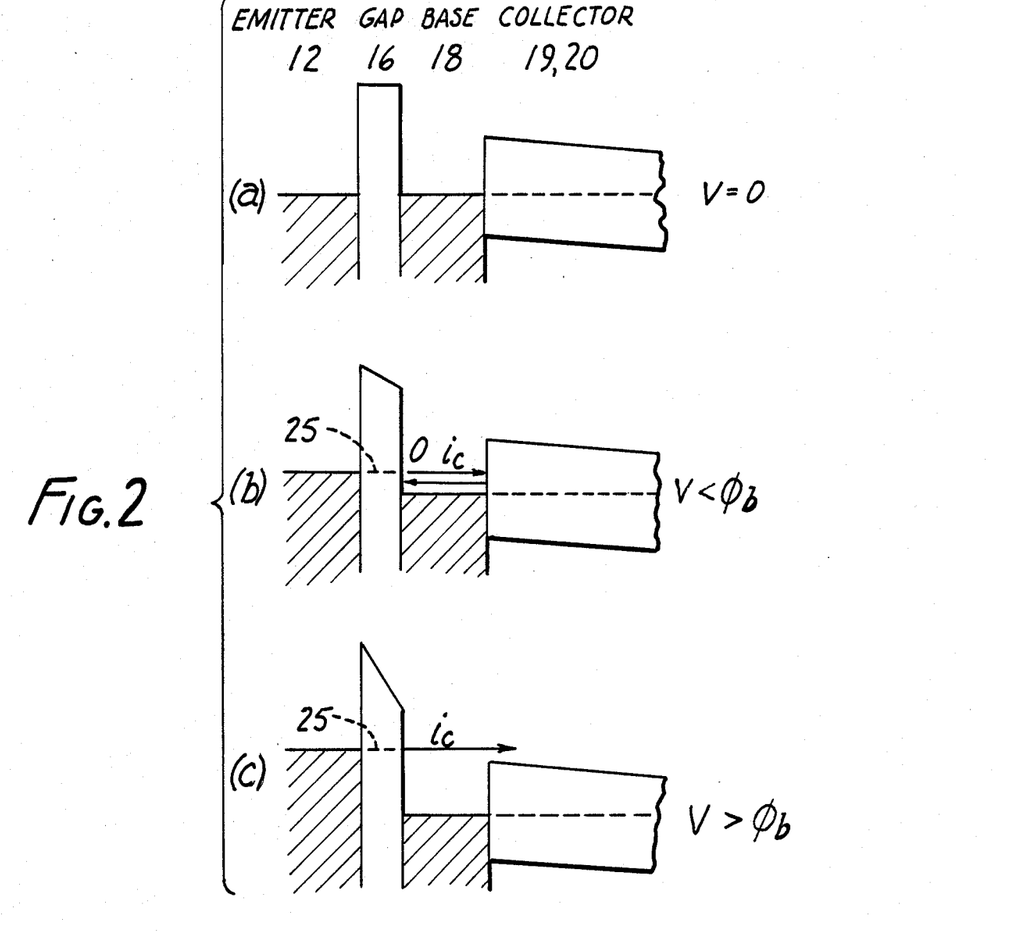
FIG. 2 is a group of energy band diagrams applicable to an operation of the apparatus of FIG. 1 at different voltage levels represented in bands (a), (b), and (c)

A specific application is the case where the base 18 is a thin metal film which is deposited onto a semiconductor (see 20) which serves as the collector 19. The resultant Schottky barrier at the metal-semiconductor interface may then be probed by the BEEM method. An energy diagram for this structure is shown for the zero-bias case in FIG. 2a. A bias potential source 21 is shown in FIG. 1 for biasing the base 18.

When the base and collector are biased at some positive voltage less than the Schottky barrier height $\phi_b$ ($v<\phi_b$), there will be no collector current (O $i_c$, FIG. 2b). If the bias exceeds the barrier height ($v>\phi_b$), electrons may propagate through the metal base and over the barrier into the collector (FIG. 2c, $i_c$). The collected current ic is a function of the electron mean free path in the base, the Schottky barrier height, impurities and defects at the interface, and quantum-mechanical reflection at the interface. Thus the properties of the buried interface may be probed with spatial resolution on the order of the depletion depth. This method provides a direct and accurate measure of local Schottky barrier height.

Figure 3:
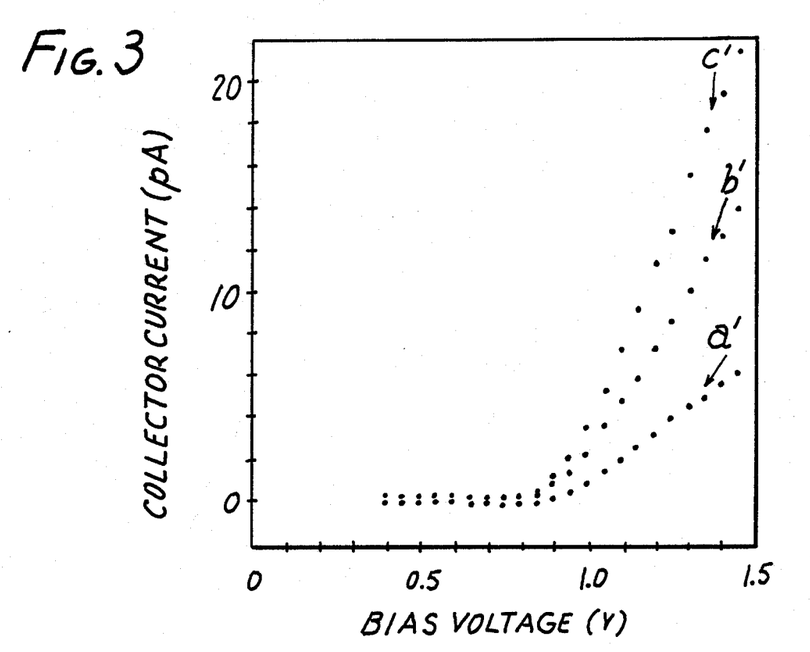
FIG. 3 is a plot of collector current as a function of bias voltage at different emitter currents in an operation of the apparatus of FIG. 1.
Figure 4:
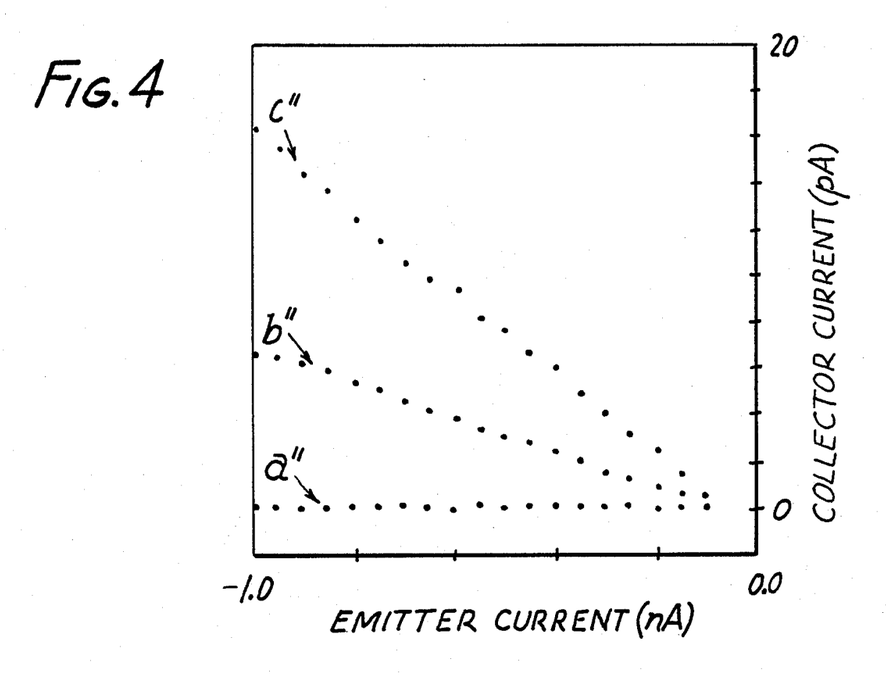
FIG. 4 is a plot of collector current as a function of emitter current at different bias voltages in an operation of the apparatus of FIG. 1.

FIG. 3 shows the collector current as a function of emitter-base voltage for several emitter currents of 0.27, 0.57, and 0.87 nA for spectra a'-c', respectively. By way of example, a 100 Å Au–n-Si sample was used at 13. FIG. 3 more specifically illustrates the turn-on of collector current $i_c$ as the bias voltage, v, exceeds the Schottky barrier height. We have been able to extract the Schottky barrier height at the Au-Si interface, and have obtained excellent fits of collector current versus emitter-base voltage. FIG. 4 is a plot of collector current as a function of emitter current at emitter-base voltages of 0.8, 1.1, and 1.4 volts for spectra a"-c", respectively. The sample was again 100 Å Au on n-Si for several sample bias voltages (see FIG. 2).

The process so far described, as well as other methods within the scope of the subject invention, may be characterized as methods of interacting electrons with a structure of matter, which provide an electrode 12 for emitting such electrons 14 at a distance from a surface 22 of that structure 13, and which cause these electrons to travel along ballistic trajectories 23 inside that structure by providing along the latter distance a gap 16 for performance of a process selected from the group of electron tunneling and field emission and injecting electrons emitted by electrode 12 with such selected process ballistically into the structure 13 through gap 16 and surface 22.

Both electron tunneling, where the wave functions of emitter and base 12 and 18 overlap, and field emission, where tunneling proceeds into the continuum, are within the scope of the subject invention. FIG. 1 illustrates establishment of an electric tunneling current 25 in the form of electrons 14 through the gap 16 between the first electrode 12 and the second electrode 18. The tunneling gap between these first and second electrodes 12 and 18 and the distance between that first electrode 12 and the structure surface 22 may be conterminous and thus semantically synonymous. However, this need not necessarily be the case within the scope of the claimed invention. For instance, the structure may have, or the base 18 may be coated with, a layer of a semiconductive or thin insulating material 26. Accordingly, the concept of distance and tunneling gap should be broadly construed within the scope of the claimed invention.

The electrons 14 or tunneling current 25 are supplied by an electric power source 30 which, for instance, may be a constant voltage source or a constant current source. If a constant voltage source is employed at 30, then a control or feedback signal for a servo loop may be derived from a change in current flowing to the electrode 12 or gap 16. On the other hand, in the case of a constant current source at 30, variations in the source voltage would supply the loop control or servo signal.

In this respect, the illustrated embodiment of FIG. 1 connects a resistor R in series with the source 30, acting as a constant voltage source, and the gap 16 or electrode 12. A voltage drop, v, occurs across the resistor R, when current, I, flows in the current supply lead 31 to the gap 16.

The illustrated embodiment observes a voltage, v, caused by current, I, from the source 30 when the gap 16 has a quiescent or initially adjusted value. The illustrated apparatus or its equivalent then derives a position control signal from a change in that voltage.

By way of example, the embodiment of FIG. 1 employs a differential amplifier DA for observing the voltage, v, caused by current, I, from the source 30 when the gap 16 has a quiescent value. One input 32 of the differential amplifier is connected to the current supply lead 31 for that purpose, so as to receive an input signal corresponding to the value of the voltage, v. The other input 33 of the differential amplifier is connected to a source 34 of reference voltage, $V_R$. An arrow through that source 34 indicates that the reference voltage is adjustable. Adjustable voltage sources are already customary in tunneling devices where they are also used for offsetting electrode and tip Fermi levels.

By way of example, the reference voltage $V_R$ may be adjusted at the source 34 to be equal to the voltage, v, across the resistor R when the gap 16 has its quiescent value, and the differential amplifier DA may signify such quiescent value of the tunneling gap by a zero output signal at 35.

Within the scope of the subject invention, emitter positioning and other control or electric signals may be derived from a sensing of variations in the tunneling current 25 or voltage across the gap 16 or, generically, of variations of an electrical property of that gap 16, corresponding, for instance, to variations in the gap 16 or in the emitter-base or emitter-structure distance.

These and other alternatives within the scope of the subject invention may be summarized by saying that an electrical property of the gap 16 or its variation is sensed and is employed to provide a control signal and even an output signal of the apparatus 10.

The differential amplifier DA or functionally equivalent circuitry within the scope of the illustrated embodiment, in effect determines a change in voltage, v, caused by current, I, from the source 30 in response to the gap variation at 16, and derives a servo signal or current measurement from that change in that voltage, such as by comparing the value of that changed voltage to the reference voltage $V_R$. The resulting output signal of the differential amplifier is applied via output 35 to a filter 36 which may be employed for removing noise and undesired frequencies. The filter output may be further amplified by an amplifier 38 which applies its output signal to a terminal 39 as the output signal of the servo loop 28 or, depending on the parameter under consideration, even of the apparatus 10.

Within the scope of the subject invention, a predetermined agency may be provided for restoring the gap 16 in response to variation of the tunneling current 25 or in a predetermined electrical property of the gap, and a quantity of that agency may be employed to a restoration of that gap. In that case, the signal at 39 may be derived from that quantity. By way of example, if the varied gap 16 is restored with an electric current, voltage or signal in response to variation of a predetermined electrical property of the gap 16, then the signal at 39 may be derived from that electric current, voltage or signal. In this respect, the tunneling gap 16 may be restored to its quiescent or to an initially set value in response to the above mentioned change in voltage, v.

The amplifier 38 may be a variable gain operational amplifier for increased stability, and/or may be a high-voltage amplifier for driving emitter position adjusting means, as more fully described below.

The illustrated embodiment of the invention analyzes the electrons 14 after their travel along ballistic trajectories 23 in the structure 13. An example of an analysis has been given above with the aid of FIGS. 2a–c, enabling qualitative and quantitative analyses with respect to Schottky barrier formation properties. Other analyses will be mentioned in the further course of this disclosure. However, it should be understood that the expressions "analyze" and "analysis", and terms of like import are used herein and in the claims with the intention that they be interpreted very broadly, covering not only such concepts as study, investigation, measurement and other activities or functions of "examining in detail so as to determine the nature or tendency thereof," but also functions which in effect use the ballistic electrons, or which transduce their flow, into a discernible signal of a different kind, with or without amplification. Accordingly, reproduction of recorded, sensed or transmitted information from ballistically injected and subsequently collected electrons, or phases of such reproductions involving such electrons, are intended to fall within the import of "analyze," "analysis," and the like. This by way of example, rather than limitation, since the utility of the subject invention is such that the meaning of analyze, as herein employed, in effect becomes synonymous with utilization of the collected carriers.

In this context and in general, ballistically injected electrons are collected from the structure 13 after their travel along ballistic trajectories 23 for analysis of such collected electrons, such as by further processing or otherwise. By way of example, a collector electrode 19 is provided for or in the structure of matter 13. That collector electrode is located at a distance from the surface 22 or base electrode 18, so that the trajectories extend from that surface through matter of the structure 13 to that collector electrode 19. The ballistically injected electrons then are collected from the trajectories 23 with the collector electrode for analysis of such collected electrons.

Where material of the structure 13 is electrically conductive or semiconductive, a stratum of that material, such as the layer 20 or 52, may be used as collector electrode.

The apparatus 10 may be situated in an enclosure 41, only part of which is shown in order to avoid crowding of the drawing. However, the enclosure 41 or an equivalent means enables provision of a vacuum at least in the gap 16. Alternatively, the tunneling 25 may be conducted in a fluid, such as an inert atmosphere provided at least in the gap 16.

Within the scope of the subject invention, the electrons 14 may be ballistically projected through the structure 13, or though at least one layer or stratum thereof. For instance, everything may be omitted from the illustrated structure 13, except the base electrode 18 and semiconductor or other layer 20. At least in that case, it is possible for the ballistic electron trajectories to extend through what is left of structure 13. FIG. 1 shows a trajectory 43 for electrons 14 that extends through the structure of matter.

In these cases, when there is no collector electrode 19 in the structure, then there has to be some collector electrode or collector elsewhere. For instance, a collector, electron detector or electron multiplier may be located at a distance from the structure 13, as indicated by way of example in FIG. 1 at 45.

In a sense, comparison to ballistics of projectiles is compelling. However, an analogy breaks down when the operation of the subject invention is more thoroughly considered. For instance, conventional ballistics distinguishes between interior and exterior ballistics. Interior ballistics deals with propellant and projectile behavior inside a gun, while exterior ballistics deals with subsequent projectile behavior in a fluid environment, typically the atmosphere.

So far, there has been a strong analogy in electronics, where acceleration and behavior of electrons in an electron gun could be considered as concerning a kind of interior ballistics, while a concept of exterior ballistics would apply to movement of electrons shot from an electron gun into a typically evacuated space.

In the case of the subject invention, the analogy breaks down or at least has to be substantially modified. In particular, whatever may be considered under the rubric of interior ballistics concerning electrons or carriers 14, actually takes place in the fluid-filled or even evacuated tunneling or field emission gap 16, while a subsequent exterior ballistics would concern electrons or carriers proceding along trajectories 23 inside a structure, such as the multi-electrode structure 13 shown in FIG. 1 or its different material counterparts.

Figure 5:
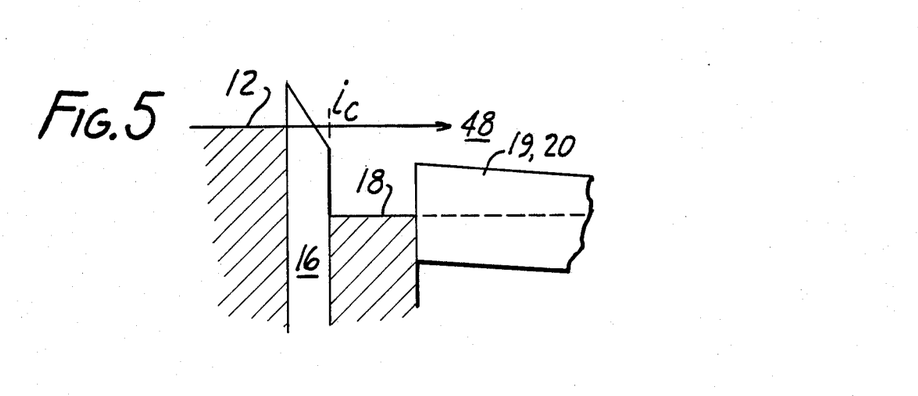
FIG. 5 is an energy band diagram representing field emission ballistics in an operation of the apparatus of FIG. 1.

In this respect and in general, electrons or other carriers may be propelled and ballistically projected by tunneling, such as illustrated with the aid of FIG. 2, or by field emission, such as indicated in FIG. 5.

As mentioned above, and as indicated in FIG. 5, field emission proceeds into the continuum 48. While electron tunneling and field emission are alternatives for accelerating and ballistically projecting electrons within the scope of the subject invention, electron tunneling presently is considered the best mode of carrying out the subject invention, and we believe that higher efficiency and sensitivity is achievable thereby.

While the tunneling current 25 is shown in FIG. 1 as impinging perpendicularly on the structural surface 22, it is within the scope of the subject invention to analyze electrons injected ballistically into the structure 13 as to angle and energy. By way of example, the emitter electrode or tunneling tip 12 may be tilted so that the electrons 14 in the tunneling or field emission current proceed at an acute angle to the surface 22 or elongate structure 13. Electron entrance angle may also be varied by the topography of the structure 13. Exit angle and energy may also be analyzed, such as by moving collector 45.

FIG. 1 shows an example of a multielectrode structure at 13 having electrodes 18, 19 and 51 with intervening strata of semiconductive material 20 and 52, for instance. A switch 54 or other switching device may be employed for utilizing as collector electrode either the electrode 19, as described above, or an electrode 51, which is the third electrode of the structure 13, as seen from the surface 22, or the fourth electrode of the structure, if the emitter electrode 12 is counted as well. In these and other cases, one or more of the electrodes may be electrically biased. One bias has already been shown at 21 for the base electrode 18. Another bias voltage 56 may be connected to the central electrode 19 by closure of a switch 57. In that case, the switch 54 may be actuated to its second position, shown by a dotted line 58, whereby the outer electrode 51 becomes the collector electrode of the structure 13. In this manner, electrons may either be collected by the electrode 19, as described above, or by the electrode 51, as just described. In either case, the switch 54 applies the collected electrons to the collector electrode lead 59. In this manner, and by biasing intervening or other electrodes, as shown by way of example in FIG. 1 at 56 and 57, various internal ballistic studies, analyses and effects may be carried out in the structure 13.

Reflecting here on the *Hot-Electron Transport* article by Sze et al mentioned above, it should be realized that the tunnel and field effect carrier ballistics herein disclosed also have utility in transistor devices, where electrons 14 may be ballistically injected into a semiconductor structure 13 by field emission or preferably electron tunneling for control and collection of electrons proceeding along ballistic trajectories 23 in the structure, and generation of a resulting signal at 39 or 59 in amplification and other signal discernment falling within the concept of analysis, as broadly intended within the scope of the subject invention. This by way of example, since the subject invention has utility in semiconductor technology in general.

In this respect, semiconductor technology has evolved the concept of carriers as generic to electrons and holes traveling through semiconductive materials.

Similarly, while this disclosure mainly expresses itself in terms of electron ballistics, it should be understood that the invention extends to carrier ballistics, covering not only electrons, but also positive carriers or holes.

For highest analytical benefit, a preferred embodiment of the subject invention scans the structure 13 with the emitter or tip 12. In this or any equivalent matter, the ballistic injection of carriers 14 is shifted along the surface 22 to provide successively different ballistic trajectories 23 for the injected carriers in different regions of the structure 13. Carriers traveling along such ballistic trajectories may thus be employed for investigations inside that structure.

By way of example, scanning may be effected with the aid of a "piezotripod" of the type described in the above mentioned 1986 *Rev. Sci. Instrum.* article by Gerber et al. However, our experiments and prototype work were conducted with the kind of piezodrive disclosed in the above mentioned Kaiser and Jaklevic article to which reference should be had in this connection.

Like the scanner part of the STM of that article, the ballistic carrier injection scanner 61 shown in FIG. 1 has X and Y piezodrives or drive legs 62 and 63 made from a single piece of material and disposed at an angle to each other which, in practice, may be a right angle. The Z piezodrive 64 is mechanically mounted at the apex of the X-Y piezo. The tip 12 or a holder therefor is fastened to the Z piezodrive, such as in the manner disclosed in the above mentioned Kaiser and Jaklevic article.

As apparent from FIG. 1, the Z piezo 64 is part of the feedback loop 28, so to speak, or is at least driven by the loop or feedback signal appearing as mentioned above at terminal 39. Initial positioning of the emitter or carrier tunneling tip 12 may thus be effected, such as by adjustment of the variable voltage or voltage source at 34. An electric signal may then be derived from variations in the gap 16, the voltage thereacross or the tunneling current 25 therethrough. By way of example, FIG. 1 shows how such a signal may be derived at 39 and may be measured or otherwise rendered discernible, such as with a ballistic or other instrument 66 connected to the terminal 39.

The servo loop signal occurring at 39 is also applied to an analog to digital converter 67 as an information signal to a computer and data storage 68. A component 69 connected to the computer and data storage is representative of a data recorder, X-Y plotter, oscilloscope, oscillograph, and any other instrument rendering the information visible or otherwise discernible.

As indicated by leads 71 and 72, the computer 68 also controls the X and Y drives 62 and 63 of the scanning apparatus 61 via amplifiers 73 and 74.

In this or any equivalent manner within the scope of the subject invention, topographical information may thus be derived about the structure 13 with the aid of the carriers 14 during the scanning herein mentioned. An example of that embodiment of the subject invention will now be explained with the aid of FIG. 6.

Figure 6:
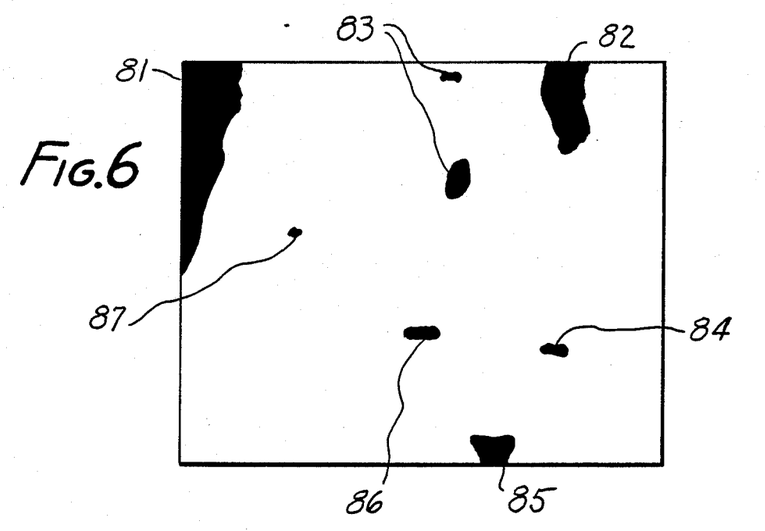
FIG. 6 is a representation of an X-Y plot displaying topographical information about a structure obtained with an operation of the apparatus shown in FIG. 1.

In particular, FIG. 6 illustrates a result of an X-Y plot effected with the apparatus shown in FIG. 1 on a semiconductor device of the type shown at 13. An X-Y plotter, such as the one symbolized at 69, could be used for that purpose with or without the computer and data storage 68.

Figure 7:
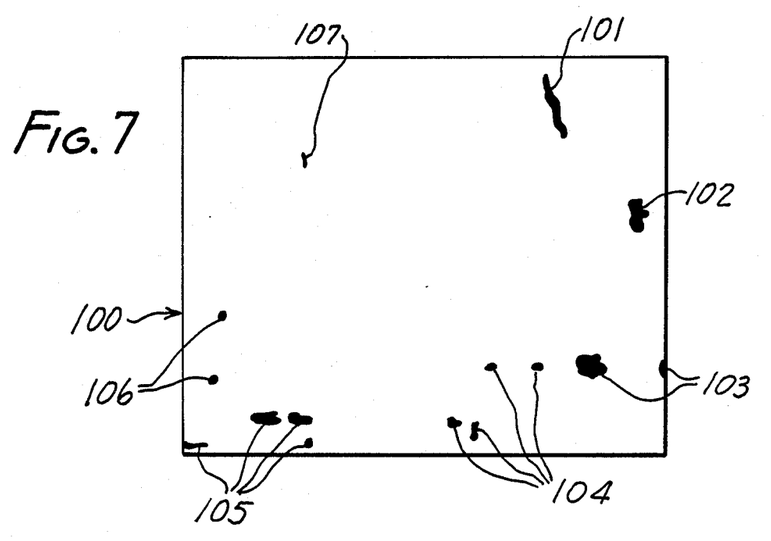
FIG. 7 is a representation of an X-Y plot depicting information obtained internally of a structure by ballistic electron injection and scanning with the apparatus shown in FIG. 1 operated according to a preferred embodiment of the subject invention.

Ordinarily, a plot of the type shown in FIG. 6 would most likely be all black, with topographical heights appearing as white spots therein. However, predominantly black surfaces are not amenable to facile illustration in patent drawings. Accordingly, FIGS. 6 and 7 show a reversal in which the heights appear as black surfaces against a white background, such as at 81, 82, 83, 84, 85, 86 and 87 in FIG. 6.

The representation of heights 81 through 87 and other information provided by the kind of plot shown in FIG. 6 and the kind of technique described in conjunction therewith, is highly useful in many respects, but in a way remains at the level that could be handled by advanced STM technology. What is really needed to satisfy the above mentioned and other demands of advanced investigation, research and development, and more advanced manufacture, is an in-depth method of looking into the structure 13 and into other structures of matter.

Accordingly, one aspect of the subject invention ballistically injects carriers into the structure while scanning the same and analyzing carriers collected in this manner from the structure at various points thereof. In this or any equivalent manner, a preferred embodiment of the subject invention derives information about an internal quality of the structure with the aid of carriers ballistically injected into that structure during scanning.

By way of example, collector current collected at 19, 20 or 51 with or without bias of either of these electrodes, could be plotted by an instrument of the type shown in FIG. 1, in order to provide meaningful insights into the structure 13 and its composition. Such collector currents could also be observed from point to point by an instrument illustrated at 89 in FIG. 1.

Similarly, an instrument 91 may be employed to observe the emitter bias or current. Both such emitter signals and simultaneous collector signals may be employed to provide advanced information about the nature and inside of the structure 13. By way of example, FIG. 1 shows a current amplifier 92 which receives base and collector voltages at its inputs and which supplies a corresponding output signal at 93 representing the collector current. That component 92, shown with its feedback path 94, may, for instance, be a low-impedance current amplifier of the type Burr-Brown OPA-128.

That output signal of the current amplifier 92 is applied to the computer and data storage 68 or directly to an X-Y plotter 69, as it was in our preparation of FIG. 7.

In particular, the plot 100 of FIG. 7 was provided by combining and plotting signals from the base and collector electrodes 18 and 19 during scanning with the apparatus 61, thereby deriving information about the internal quality of the structure 13 with the ballistically injected carriers.

As a result, discernible areas 101, 102, 103, 104, 105, 106 and 107 appeared in the plot. It will be noted that these areas or spots 101 to 107 do not coincide with the topographical information 81 to 87 in FIG. 6. Rather, these areas or spots represent indications of internal quality factors of the structure 13. For instance, impurities, internal defects, and irregularities, such as in the Schottky barrier height, may be plotted and detected in this manner for remedial action or further research and development.

A combination of the topographical and qualitative plottings of the type shown in FIGS. 6 and 7 may be particularly useful in this respect.

The BEEM concept of the subject invention may also be applied to systems and devices with several collector layers and more than one interface, with a collected current being measured in each layer. Several instruments or measurement systems may be employed for that purpose, and FIG. 1 shows a further instrument 99 for measuring or depicting a collector current. The subject invention may, therefore, be applied to superlattice structures to study interface properties and band line-ups with high spatial resolution.

In conclusion, BEEM enables direct and high-spatial-resolution probing of device structures. The properties of *buried* interfaces, previously hidden from direct study, may now be investigated, such as for the purpose of device interface physics and device fabrication technology, to name a couple of examples.

The subject extensive disclosure will render apparent or suggest to those skilled in the art various modifications and variations within the spirit and scope of the subject invention and equivalents thereof.

We claim:

1. In a method of interacting carriers with a structure of matter, the improvement comprising in combination the steps of:
   providing said structure as a layered structure including an interface therein;
   providing an emitter electrode for emitting said carriers at a distance from a surface of said layered structure;
   causing said carriers to travel along ballistic trajectories inside said layered structure by providing along said distance a gap for performance of a process selected from the group of carrier tunneling and field emission and injecting said carriers emitted by said emitter electrode with said process ballistically into said layered structure through said gap and said surface; and
   analyzing with said carriers after said travel along said ballistic trajectories interface properties in said layered structure including said interfaces.

2. A method as claimed in claim 1, including the steps of:
   collecting said ballistically injected carriers from said interface in said structure for analysis of interface properties.

3. A method as claimed in claim 1, including the steps of:
   providing a collector electrode as an electrode of said structure of matter; and
   collecting said ballistically injected carriers from said trajectories with said collector electrode for analysis of the collected carriers.

4. A method as claimed in claim 1, including the step of:
   providing a vacuum in said gap.

5. A method as claimed in claim 1, including the step of:
   providing said gap with an inert atmosphere.

6. A method as claimed in claim 1, including the steps of:
   providing an electrode in said structure;
   collecting said carriers after ballistic projection with said electrode in said structure; and
   analyzing said carriers collected with said electrode in said structure.

7. A method as claimed in claim 6, including the step of:
   scanning said structure with said emitter electrode.

8. A method as claimed in claim 1, including the steps of:
   providing a collector electrode at said structure;
   providing a bias electrode in said structure;
   electrically biasing said bias electrode;
   collecting said carriers with said collector electrode after ballistic projection through said structure; and
   analyzing said carriers collected after ballistic projection through said structure.

9. A method as claimed in claim 1, including the steps of:
   providing said emitter electrode as a first electrode at said distance from said surface as a first surface of said structure;
   performing said process with said first electrode and with a second electrode spaced from said first electrode by said gap;
   locating a third electrode at a second surface of said sheet opposite said first surface;
   ballistically projecting said carriers with said first and second electrodes and said gap through said structure to said third electrode;
   collecting said ballistically projected carriers with said third electrode; and
   analyzing said ballistically projected carriers collected with said third electrode.

10. A method as claimed in claim 1, including the steps of:
    providing said emitter electrode as a first electrode at said distance from said surface;
    providing said layered structure with a second electrode spaced from said first electrode by said gap requisite for said process;
    providing said layered structure with a third electrode spaced from said second electrode so that said trajectories extend between said second and third electrodes;
    ballistically injecting said carriers with said first and second electrode through said gap into said structure for travel along said trajectories; and
    collecting said ballistically injected electrodes from said trajectories with said third electrode.

11. A method as claimed in claim 10, including the step of:
    scanning said structure with said first electrode.

12. A method as claimed in claim 10, including the step of:
    covering said second electrode with an electric insulator penetrable by said carriers in said gap.

13. A method as claimed in claim 1, including the step of:
    shifting said ballistic injection of carriers along said surface to provide successively different ballistic trajectories for said injected carriers in different regions of said structure.

14. A method as claimed in claim 1, including the step of:
    employing said carriers traveling along said ballistic trajectories for Schottky barrier investigations inside said structure.

15. A method as claimed in claim 1, including the steps of:
    providing a multielectrode semiconductor device as said structure;
    providing said gap for performance of said process between said electrode for emitting said carriers and one electrode of said multielectrode semiconductor device for injecting said carriers ballistically into said semiconductor device; and collecting said ballistically injected carriers after travel along ballistic trajectories in said semiconductor device with another electrode of said multielectrodes semiconductor device.

16. A method as claimed in claim 1, including the step of:
scanning said structure with said electrode.

17. A method as claimed in claim 16, including the step of:
deriving topographical information about said structure with the said of said carriers during said scanning.

18. A method as claimed in claim 17, including the step of:
deriving information about an internal quality of said structure with the aid of said carriers ballistically injected into and collected from said structure during scanning.

19. A method as claimed in claim 1, including the step of:
deriving information about internal irregularities in said structure with the aid of said carriers ballistically injected into said structure during said scanning.

20. In a method of interacting carriers with a structure of matter, the improvement comprising in combination the steps of:
providing said structure with a base electrode and with a collector electrode spaced from said base electrode;
providing an emitter electrode for emitting said carriers at a distance from a surface of said structure;
causing said carriers to travel along ballistic trajectories inside said structure by providing along said distance a gap for performance of process selected from the group of carrier tunneling and field emission and injecting said carriers emitted by said emitter electrode with said process ballistically into said structure through said gap and said surface;
scanning said structure with said electrode;
collecting said ballistically injected carriers from said structure; and
deriving information about an internal quality of said structure with the said of said carriers ballistically injected into said structure by combining and plotting signals from said base and collector electrodes during said scanning.

21. In apparatus for interacting carriers with a layered structure including an interface therein, the improvement comprising in combination:
an emitter electrode for emitting said carriers at a distance from a surface of said layered structure;
means for causing said carriers to travel along ballistic trajectories inside said layered structure, including means for providing along said distance a gap for performance of a process selected from the group of carrier tunneling and field emission, and means for injecting said carriers emitted by said emitter electrode with said process ballistically into said structure through said gap and said surface; and
means for analyzing interface properties in said layered structure, including means for collecting said carriers after travel along said ballistic trajectories from said interface in said structure.

22. Apparatus as claimed in claim 21, wherein:
said means for collecting said carriers include a semiconductor for collecting said ballistically injected carriers from said structure.

23. Apparatus as claimed in claim 21, wherein:
said collecting means include a collector electrode for said structure of matter.

24. Apparatus as claimed in claim 21, including;
means for providing a vacuum in said gap.

25. Apparatus as claimed in claim 21, including:
means for providing said gap with an inert atmosphere.

26. Apparatus as claimed in claim 21, wherein:
said injecting means including means for ballistically projecting said carriers through said structure; and
said means for collecting said carriers include means for collecting said carriers after ballistic projection through said structure.

27. Apparatus as claimed in claim 26, including:
means for scanning said structure with said electrode.

28. Apparatus as claimed in claim 21, wherein:
said injecting means including means for ballistically projecting said carriers through said layered structure; and
said means for collecting said carriers include a collector electrode at said layered structure for collecting said carriers after ballistic projection through said layered structure.

29. Apparatus as claimed in claim 21, wherein:
said means for causing said carriers to travel along ballistic trajectors include means for performing said process with said emitter electrode as a first electrode at a first distance from a first surface of said layered structure, and a second electrode spaced from said first electrode by said gap;
said collecting means include a third electrode at a second surface of said layered structure opposite said first surface for collecting said ballistically projected carriers; and
said injecting means includes means for ballistically projecting said carriers with said first and second electrodes and said gap through said layered structure to said third electrode.

30. Apparatus as claimed in claim 21, wherein:
said means for causing said carriers to travel along ballistic trajectories include means for performing said process with said emitter electrode as a first electrode at said distance from said surface and with a second electrode spaced from said first electrode by said gap requisite for said process;
said collecting means include a third electrode spaced from said second electrode so that said trajectories extend between said second and third electrodes for collection of said ballistically injected electrodes from said trajectories with said third electrode; and
said injecting means include means for ballistically injecting said carriers with said first and second electrodes through said gap into said structure for travel along said trajectories to said third electrode.

31. Apparatus as claimed in claim 30, including:
means for scanning said structure with said first electrode.

32. Apparatus as claimed in claim 21, including:
means for shifting said ballistic injection of carriers along said surface to provide successively different ballistic trajectories for said injected carriers in different regions of said structure.

33. Apparatus as claimed in claim 21, wherein:
said collecting means include means for enabling investigations inside said structure with said carriers traveling along said ballistic trajectories.

34. Apparatus as claimed in claim 21, for operation with a multielectrode semiconductor device as said structure, wherein:
said gap for performance of said process exists between said emitter electrode for emitting said carriers and one electrode of said multielectrode semiconductor device for injecting said carriers ballistically into said semiconductor device; and
said collecting means include means for collecting said ballistically injected carriers after travel along ballistic trajectories in said semiconductor device with another electrode of said multielectrode semiconductor device.

35. Apparatus as claimed in claim 21, including:
means for scanning said structure with said electrode.

36. Apparatus as claimed in claim 35, including:
means connected to said collecting means for deriving topographical information about said structure with the aid of said carriers during said scanning.

37. Apparatus as claimed in claim 36, including:
means connected to said collecting means for deriving information about an internal quality of said structure with the aid of said carriers ballistically injected into said structure during scanning.

38. Apparatus as claimed in claim 35, including:
means connected to said collecting means for deriving information about an internal quality of said structure with the aid of said carriers ballistically injected into said structure during said scanning.

39. Apparatus as claimed in claim 35, wherein:
said structure has a base electrode and a collector electrode spaced from said base electrode for collecting said ballistically injected carriers from said structure; and
said apparatus includes means connected to said collecting means for deriving information about an internal quality of said structure by combining and plotting signals from said base and collector electrodes during said scanning.

40. A method as claimed in claim 1, including a the steps of:
providing said layered structure as a superlattice structure including said interface therein; and
employing said carriers traveling along said ballistic trajectories to study band line-ups in said superlattice structure.

41. In a method of interacting carriers with a structure of matter, the improvement comprising in combination the steps of:
providing a first electrode for emitting said carriers at a distance from a surface of said structure;
providing said structure with a second electrode spaced from said first electrode by a gap requisite for performance of a process selected from the group of carrier tunneling and field emission causing said carriers to travel along ballistic trajectories inside said structure;
providing said structure with a third electrode spaced from said second electrode so that said trajectories extend between said second and third electrodes;
ballistically injecting said carriers with said first and second electrodes through said gap into said structure for travel along said trajectories;
collecting said ballistically injected electrodes from said trajectories with said third electrode, and
analyzing said carriers after said travel along said ballistic trajectories in said structure.

42. A method as claimed in claim 41, including the step of:
scanning said structure with said first electrode.

43. A method as claimed in claim 41, including the step of:
covering said second electrode with an electric insulator penetrable by said carriers in said gap.

44. A method as claimed in claim 41, including the steps of:
shifting said ballistic injection of carriers along said surface to provide successively different ballistic trajectories for said injected carriers in different regions of said structure.

45. A method as claimed in claim 41, including the step of:
employing said carriers traveling along said ballistic trajectories for investigations inside said structure.

46. A method as claimed in claim 41, including the steps of:
providing a multielectrode semiconductor device as said structure including said second and third electrodes;
providing said gap for performance of said process between said first electrode for emitting said carriers and said second electrode in said multielectrode semiconductor device for injecting said carriers ballistically into said semiconductor device; and
collecting said ballistically injected carriers after travel along ballistic trajectories in said semiconductor device with said third electrode in said multielectrode semiconductor device.

47. In apparatus for interacting carriers with a multielectrode semiconductor device, the improvement comprising in combination:
an emitter electrode for emitting said carriers at a distance from a surface of said structure;
means for causing said emitter electrode to inject said carriers ballistically into said structure through said gap and said surface and for causing injected carriers to travel along ballistic trajectories inside said structure, including means for providing along said distance gap between said emitter electrode and one electrode of said multielectrode semiconductor device for performance of a process selected from the group of carrier tunneling and field emission; and
means including another electrode of said multielectrode semiconductor device for collecting said carriers after said travel along said ballistic trajectories in said structure.

48. Apparatus as claimed in claim 47, including:
means for scanning said structure with said emitter electrode.

* * * * *